United States Patent [19]

Liechti et al.

[11] Patent Number: 4,914,190
[45] Date of Patent: Apr. 3, 1990

[54] TRICYANOVINYL-N,N-DISUBSTITUTED ANILINES AS DISPERSE DYES

[75] Inventors: Peter Liechti, Arisdorf; Angelo D. Casa, Riehen, both of Switzerland

[73] Assignee: Ciba-Geigy Corporation, Ardsley, N.Y.

[21] Appl. No.: 166,944

[22] Filed: Mar. 11, 1988

[30] Foreign Application Priority Data

Mar. 19, 1987 [CH] Switzerland .......................... 1050/87
Dec. 29, 1987 [CH] Switzerland .......................... 5091/87

[51] Int. Cl.⁴ ..................... C09B 23/14; C09B 43/00; D06P 1/16; D06P 3/00
[52] U.S. Cl. ................................... 534/859; 534/850; 534/851; 534/856; 534/741; 534/752; 534/775; 534/588; 534/598; 548/485; 548/486; 548/545; 548/546; 549/63; 549/64; 549/65; 549/66; 549/68; 549/72; 558/398; 558/399; 558/401; 558/403
[58] Field of Search ............... 534/850, 851, 859, 856, 534/741, 752, 775; 558/401, 398, 399, 403; 548/485, 486, 545, 546; 549/63, 64, 65, 66, 68, 72

[56] References Cited

U.S. PATENT DOCUMENTS

| | | | |
|---|---|---|---|
| 2,733,258 | 1/1956 | Hein | 558/401 X |
| 2,749,229 | 6/1956 | Ligett et al. | 558/401 X |
| 2,762,833 | 9/1956 | Heckert | 558/401 |
| 2,849,447 | 8/1958 | Kartinos et al. | 558/401 X |
| 2,889,335 | 6/1959 | Heckert | 260/313 |
| 3,890,367 | 6/1975 | Cahoy | 558/401 |
| 3,926,945 | 12/1975 | Roberts et al. | 534/856 |
| 4,035,380 | 7/1977 | Peter et al. | 558/401 X |
| 4,101,269 | 7/1978 | Champenois | 534/856 |
| 4,258,182 | 3/1981 | Beecken | 558/401 X |

FOREIGN PATENT DOCUMENTS

| | | | |
|---|---|---|---|
| 835291 | of 0000 | Belgium | 558/401 |
| 2059291 | 6/1972 | Fed. Rep. of Germany | 558/401 |
| 3417840 | 11/1984 | Fed. Rep. of Germany | 558/401 |
| 2224520 | of 0000 | France | 558/401 |
| 59-129263 | 7/1984 | Japan | 558/401 |
| 59-129264 | 7/1984 | Japan | 558/401 |
| 1058662 | 2/1967 | United Kingdom | 558/401 |
| 1110714 | 4/1968 | United Kingdom | 558/401 |

OTHER PUBLICATIONS

B. C. McKusick et al., vol. 80, pp. 2806-2815 (1958), J. Am Chem. Soc.
Chemical Abstract, 101: 2126722 (1984).

Primary Examiner—Floyd D. Higel
Attorney, Agent, or Firm—Edward M. Roberts

[57] ABSTRACT

Disperse dyes of the formula

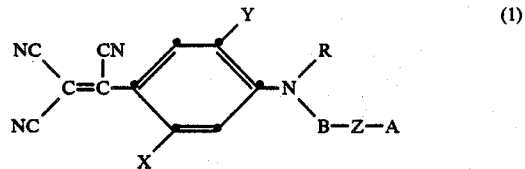

(1)

in which
X is hydrogen, $C_1$–$C_4$alkyl, $C_1$–$C_4$alkoxy or halogen, Y is hydrogen, halogen, $C_1$–$C_4$alkyl, $C_1$–$C_4$alkoxy, $C_1$–$C_4$alkoxy-$C_1$–$C_4$alkyl or $C_1$–$C_4$-alkoxy-$C_1$–$C_4$alkoxy, R is hydrogen, $C_1$–$C_{12}$alkyl, $C_2$–$C_{12}$alkenyl or phenyl, or Y and R, together with the nitrogen atom and the two C atoms linking them, form a 5- or 6-ring, B is a straight-chain or branched $C_2$–$C_6$alkylene radical, Z is a bridge member of the formula

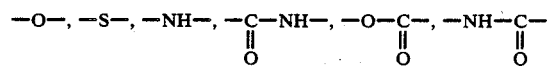

or a direct bond and A is a radical of the formula

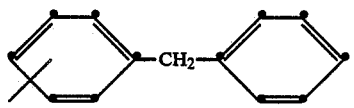

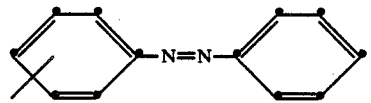

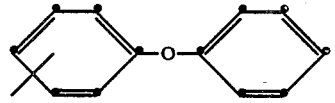

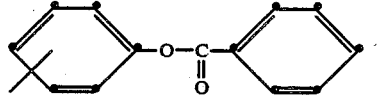

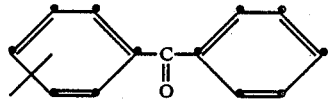

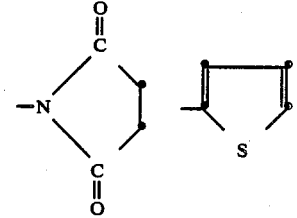

(Abstract continue on next page.)

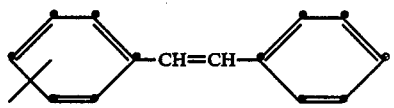
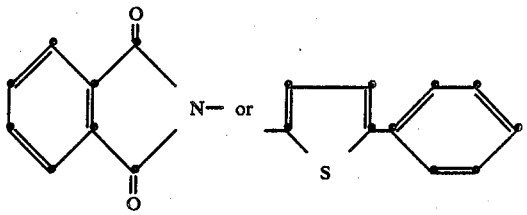
which radicals are unsubstituted or substituted by $C_1$-$C_4$-alkyl, $C_1$-$C_4$-alkoxy, halogen or nitro are suitable in particular for dyeing textile material made of polyester fibers.
13 Claims, No Drawings

TRICYANOVINYL-N,N-DISUBSTITUTED ANILINES AS DISPERSE DYES

The present invention relates to disperse dyes, to the preparation thereof and to the use thereof for dyeing synthetic organic material. The dyes according to the invention conform to the formula

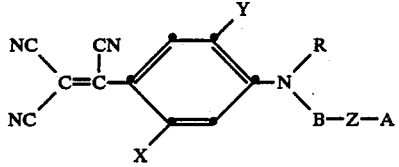

(1)

in which
X is hydrogen, $C_1$-$C_4$alkyl, $C_1$-$C_4$alkoxy or halogen,
Y is hydrogen, halogen, $C_1$-$C_4$alkyl, $C_1$-$C_4$alkoxy, $C_1$-$C_4$alkyl or $C_1$-$C_4$ alkoxy-$C_1$-$C_4$alkoxy, R is hydrogen, $C_1$-$C_{12}$alkyl, $C_2$-$C_{12}$alkenyl or phenyl, or Y and R, together with the nitrogen atom and the two C atoms linking them, form a 5- or 6-ring, B is a straight-chain or branched $C_2$-$C_6$alkylene radical, Z is a bridge member of the formula

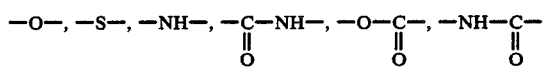

or a direct bond and A is a radical of the formula

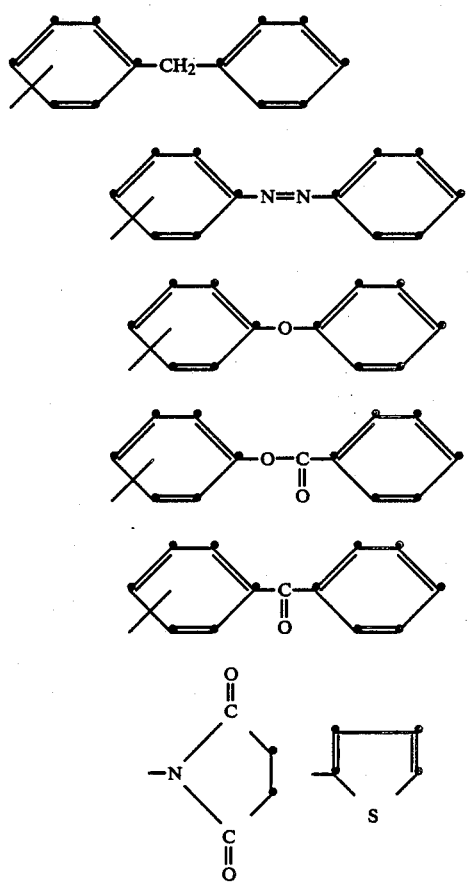

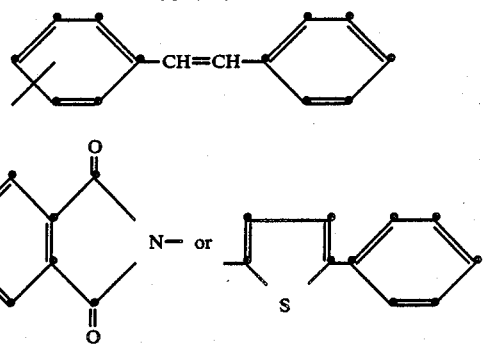

which radicals can additionally bear the substituents customary with disperse dyes.

The term alkyl groups as used in this application is generally to be understood as meaning straight-chain, branched or cyclic alkyl groups. They comprise for example methyl, ethyl, propyl, i-propyl, butyl, i-butyl, tert-butyl, amyl, tert-amyl (1,1-dimethylpropyl), 1,1,3,3-tetramethylbutyl, hexyl, 1-methylpentyl, neopentyl, 1-, 2- or 3-methyl-hexyl, heptyl, n-octyl, tert-octyl, 2-ethyl-hexyl, n-nonyl, isononyl, decyl, dodecyl, cyclopentyl, cyclohexyl, methylcyclohexyl and the associated isomers.

These alkyl radicals may be substituted, for example by hydroxyl, alkoxy, having 1 to 4 carbon atoms, in particular methoxy, cyano or phenyl. Suitable other substituents are halogen, such as fluorine, chlorine or bromine, and -CO-U, in which U is alkyl having 1 to 6 carbon atoms or phenyl.

Suitable alkenyl radicals are those radicals which are derived from the above mentioned alkyl radicals by replacement of at least one single bond by a double bond. Suitable radicals are for example ethenyl and propenyl.

Suitable alkoxy radicals are for example methoxy, ethoxy, propoxy, isopropoxy, n-butoxy, i-butoxy and tert-butoxy.

Examples of suitable substituted alkyl radicals are: methoxymethyl, ethoxymethyl, ethoxyethyl, ethoxypropyl, n-propoxymethyl, iso-propoxymethyl, butoxymethyl, butoxyethyl, butoxypropyl, ethoxypentyl, methoxybutyl, ethoxypentyl, 2-hydroxyethoxypentyl, cyanoethyl and hydroxyethyl.

The alkylene radicals B can likewise be straight-chain or branched or even substituted. Possibilities are for example ethylene, 1,3-propylene, 1,2-propylene, 1,2-butylene, 1,6-hexylene, 2-hydroxy-1,3-propylene and 2-chloro-1,3-propylene.

The term phenyl radicals as used in this application is generally to be understood as meaning unsubstituted or substituted phenyl radicals. Possible substituents are for example $C_1$-$C_4$alkyl, $C_1$-$C_4$alkoxy, bromine, chlorine, nitro and $C_1$-$C_4$alkylcarbonylamino.

The term halogen as used in this application is generally to be understood as meaning fluorine, bromine and in particular chlorine.

Z is a direct bond or a bridge member from the series —O—, —S—, —NH—,

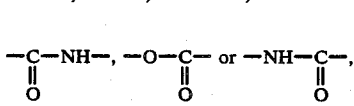

-continued where —O— and —O—C—
                      ‖
                      O are preferred if the bond to the radical A is via a carbon atom of this radical. If the radical A has a hetero atom via which the bond to the rest of the dye molecule of the formula (1) is established, Z is preferably a direct bond.

Preferred radicals A are the radicals of the formulae

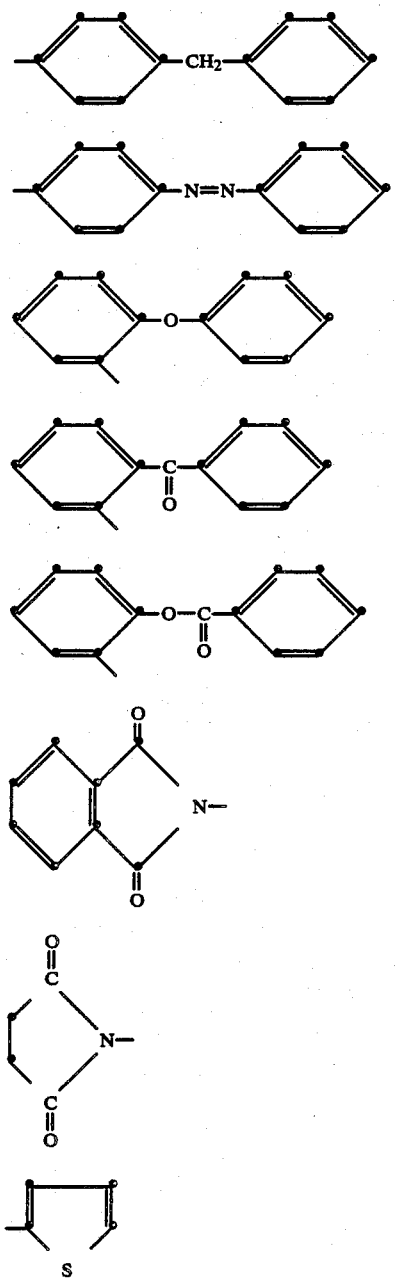

These radicals can additionally bear the substituents customery with disperse dyes, for example $C_1$–$C_4$alkyl, $C_1$–$C_4$alkoxy, halogen or nitro.

The preferred meanings of X are hydrogen, methyl, methoxy, chlorine and bromine, particular preference being given to hydrogen and methyl. Y is preferably chlorine, methyl, methoxy, methoxyethyl or methoxyethoxy and in particular hydrogen.

The preferred meaning of R is $C_1$–$C_4$alkyl, which can be substituted by hydroxyl, $C_1$–$C_4$alkoxy or phenyl. In particularly preferred compounds of the formula (1), R is methyl, ethyl or benzyl.

R and Y can combine with the nitrogen atom and the two C atoms joining them to form a 5- or 6-membered ring which can contain an oxygen atom as a further hetero atom. Suitable substituents for these rings are for example hydroxyl, methyl, methoxy, chlorine and phenyl. Preferably, R and Y together with the nitrogen atom and the two C atoms joining them form a 6-ring which is unsubstituted or bears 1 to 3 methyl groups.

B is preferably a straight-chain or branched alkylene radical having 2 to 4 carbon atoms which can be substituted by hydroxyl. Particular preference is given to the disperse dyes of the formula (1) in which B is ethylene or 1,3-propylene.

Because of their good coloristic properties, interest is attracted in particular by the dyes of the formula

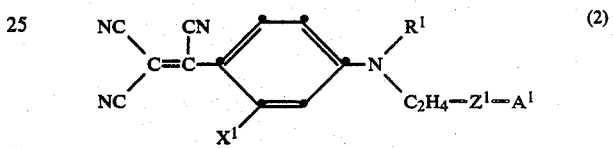

in which $X^1$ is hydrogen or methyl, $R^1$ is methyl, ethyl or benzyl, $Z^1$ is a direct bond, —O—, —S— or

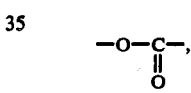

$A^1$ is a radical of the formula

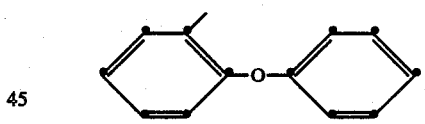

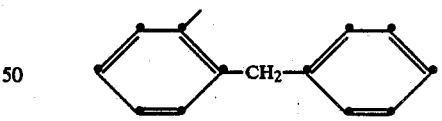

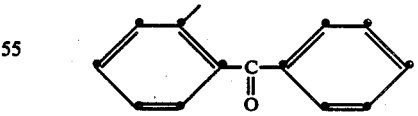

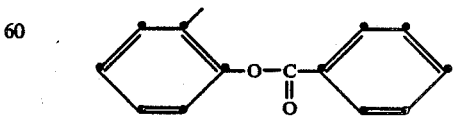

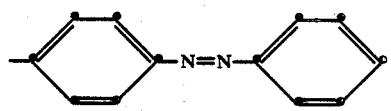

-continued or

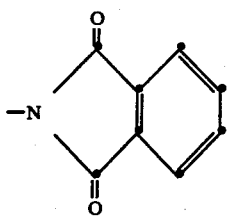

The compounds of the formula (1) are prepared in a manner known per se, for example by reacting a compound of the formula

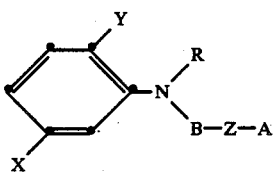
(3)

with tetracyanoethylene, or by reacting a compound of the formula

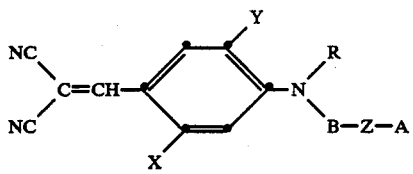
(4)

with a cyanide and then with an oxidizing agent.

The compounds of the formulae (3) and (4) are known or can be obtained in a manner known per se.

The compounds of the formula (3) can be obtained for example by reacting a compound of the formula

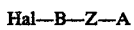
Hal—B—Z—A (5)

with an aniline derivative of the formula

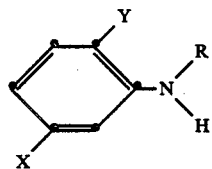
(6)

the compounds of the formula (5) being obtained for example by reacting a compound of the formula

H—Z—A (7)

with a compound of the formula
Hal—B—Hal (8)

Compounds of the formula (3) in which Z is a bridge member of the formula

are prepared for example by reacting a compound of the formula

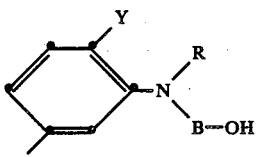
(9)

with a compound of the formula

(10)

in a manner known per se.

The compounds of the formulae (9) and (10) are known.

In the formulae (3) and (10), A, Z, B, X, Y and R are as defined under the formula (1) and Hal is chlorine or bromine, it being possible for the two halogen atoms to be identical or different.

The compounds of the formulae (7) and (8) are known or can be prepared in a manner known per se.

The reaction of the compound (7) with the compound (8) is preferably carried out in an inert organic solvent and in the presence of a base. Suitable inert organic solvents are for example compounds having a boiling point above 100° C., such as alcohols, ethers, esters, nitrobenzene, halobenzene, toluene, xylenes and the like. Suitable are in particular higher-boiling alcohols, such as tert-butanol, and also ethers of polyvalent alcohols, for example diethylene glycol monoethyl ether or monomethyl ether, and also the corresponding diethers.

The components (7) and (8) can be used in a stoichiometric ratio, or very frequently an excess of one of the components, preferably compound (8), will prove to be favourable.

The reaction temperature is between about 80° and 150° C., preferably between 100° and 130° C., and the reaction time range extends from about 1 hour to 20 hours, depending on the temperature and the reactants. After the reaction has ended, component (8), which may have been used in excess, is removed, and the compound of the formula (5) obtained is then reacted with an aniline derivative of the formula (6).

This reaction, too, is preferably carried out in one of the above-mentioned solvents. The temperature is normally above 100° C., in particular between 120° and 200° C., especially between 140° and 180° C.

The components (5) and (6) can be used in a stoichiometric ratio, although normally the more readily accessible component, usually the aniline derivative (6), will be used in excess, for example in an excess of 10%.

After the reaction has ended, the reaction mixture is worked up in a conventional manner, for example by removing the excess of component (6) and the solvent and purifying the residue if necessary, for example by recrystallization.

Both the reaction of compounds (7) and (8) and the reaction of compounds (5) and (6) are carried out in the presence of a base, not only organic but also inorganic bases being suitable, for example pyridine, piperidine, triethylamine, sodium carbonate, potassium carbonate, sodium hydrogencarbonate or potassium hydrogencarbonate. This base is generally used in a small excess, for example in an excess of 10%.

The whole preparation of compound (3) can also be carried out as a one-pot reaction in that the same solvent is used for both reaction steps and compound (5) is not isolated.

The compounds of the formula (4) are obtained for example by first reacting a compound of the formula (3) under the known conditions of the Vilsmeier synthesis with, for example, POCl$_3$ and dimethylformamide or phosgene and dimethylformamide and then reacting the product with malodinitrile.

The reaction of compounds of the formula (3) with tetracyanoethylene is carried out in a manner known per se, preferably in an inert solvent at a temperature between about 20° and 100° C., the reaction components being used in substantially equivalent amounts.

Similarly, the reaction of the compounds of the formula (4) with a cyanide and then with an oxidizing agent is carried out in a manner known per se. Preferably, the reaction is carried out as a one-pot reaction, i.e. without isolation of the intermediate, and likewise in an inert solvent. The cyanide used is in particular potassium cyanide or sodium cyanide, and the oxidizing agent used is in particular bromine.

The reaction with the cyanide is preferably carried out at about 20° to 100° C. and the reaction with the oxidizing agent at about 0° to 20° C.

Suitable inert solvents for the preceding reactions are for example halogen compounds, such as chloroform or chlorobenzene, ethers, aromatic compounds, such as benzene, toluene or xylene, but in particular tetrahydrofuran or dimethylformamide.

The dyes of the foraula (1) are isolated for example by pouring the reaction solutions into ice-water, after which the precipitated dye is filtered off, possibly washed and dried.

The compounds of the formula (1) according to the invention can be used as dyes for dyeing and printing cellulosic and in particular synthetic hydrophobic fibre materials, in particular textile materials. Textile materials composed of blend fabrics which contain such cellulosic or synthetic hydrophobic textile materials can likewise be dyed or printed with the compounds according to the invention.

Suitable cellulosic textile materials are in particular secondary cellulose acetate and cellulose triacetate.

Synthetic hydrophobic textile materials consist in particular of linear, aromatic polyesters, for example those of terephthalic acid and glycols, in particular ethylene glycol or condensation products of terephthalic acid and 1,4-bis(hydroxymethyl)cyclohexane, or polycarbonates, for example those of $\alpha,\alpha$-dimethyl-4,4'-dihydroxy-diphenylmethane and phosgene, or fibres on a polyvinyl chloride or polyamide basis.

The compounds according to the invention are applied to the textile materials using known dyeing methods. For example, polyester fibre materials are dyed from an aqueous dispersion by the exhaust method i..n the presence of customary anionic or nonionic dispersants and in the presence or absence of customary swelling agents (carriers) at temperatures between 80° and 140° C. Secondary cellulose acetate is preferably dyed at around 65° to 85° C. and cellulose triacetate at temperatures up to 115° C.

The novel dyes produce little or no staining on wool and cotton present in the dyebath at the same time (thus exhibiting very good reserve), so that they can also be efficiently used for dyeing polyester/wool and polyester/cellulose fibres blend fabrics.

However, the dyes according to the invention are suitable in particular for dyeing by the thermosol process.

For application, the textile material mentioned can be present in a wide variety of processing forms, for example as fibre, yarn or web or as woven or knitted fabric.

It is advantageous to convert the dyes according to the invention before use into a dye preparation. To this end, the dye is ground so that its average particle size is between 0.01 and 10 microns. The grinding can be carried out in the presence of dispersants. For example, the dried dye is ground together with a dispersant or kneaded in paste form together with a dispersant and then dried in vacuo or by atomizing. On addition of water the preparations thus obtained can be used for dyeing and printing.

In printing, the customary thickeners are used, for example modified or unmodified natural products, for example alginates, british gum, gum arabic, crystal gum, locust bean ether gum, tragacanth, carboxymethylcellulose, hydroxyethylcellulose, starch or synthetic products, for example polyacrylamide, polyacrylic acid or copolymers of polyvinyl alcohol.

The dyes according to the invention confer on the materials mentioned, in particular on polyester material, level orange or red shades having very good performance-fastness properties, in particular good light fastness, fastness to dry heat pleating and setting, chlorinated water and wet fastness such as water, perspiration and wash fastness; the dyeings are further typified by good pH stability and very good rub fastness. The dyeings are also very strong in color. Of particular note is the good thermomigration fastness of the dyeings obtained.

The dyes according to the invention are also efficiently usable for Producing mixed shades together with other dyes. It is of course also possible to use mixtures of the dyes according to the invention with one another.

The aforementioned use of the azo compounds of the formula (1) according to the invention forms part of the subject-matter of the present invention just as much as a process for dyeing or printing cellulosic or synthetic hydrophobic fibre material, in particular textile material, which comprises applying or incorporating one or more compounds of the formula (1) to or in the material mentioned. The hydrophobic fibre material mentioned is preferably textile polyester material. Further substrates which can be treated by the process according to the invention and preferred process conditions were mentioned above in the more detailed description of the use of the compounds according to the invention.

The present invention further provides the hydrophobic fibre material, preferably polyester textile material, dyed or printed by the process mentioned.

The Examples which follow illustrate the invention in more detail without limiting it thereto. Parts and percentages are by weight, unless otherwise stated.

EXAMPLE 1

A solution of 17.2 g of the compound of the formula

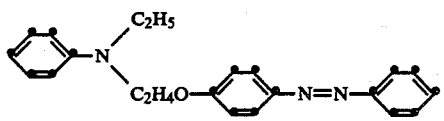

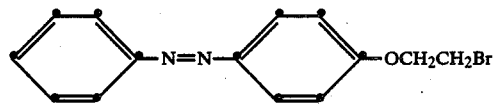

in 60 ml of dimethylformamide is admixed in the course of about 7 minutes with 7.5 g of tetracyanoethylene added a little at a time. The solution immediately turns red and heats up to about 36°. Heating is applied to raise the temperature further to 55°-60°. After about 10 minutes a thin layer chromatogram no longer shows any starting material. After cooling down to room temperature, the reaction mixture is discharged onto 500 ml of ice-water, and the sticky dye is filtered off on a nutsche filter, washed with water and then, to remove excess tetracyanoethylene, with 20 % sodium sulfite solution and finally again with water. Drying at 80° in vacuo leaves 20.7 g (92.8% of theory) of the dye of the formula

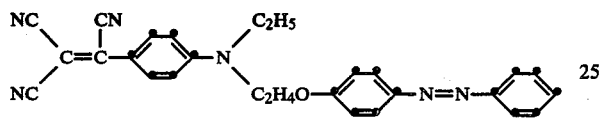

as a brownish red powder having a melting point of 158°-159°. A sample purified by chromatography likewise melts at 158°-159° and shows the following spectral data: $\lambda_{max}$ 512 nm/$\epsilon_{max}$ 43,800.

The starting compound is prepared as follows: 19.8 g of 4-hydroxyazobenzene are dissolved in 100 ml of diethylene glycol monoethyl ether, and the solution is admixed with 12.8 g of sodium carbonate and 52.5 ml of 1,2-dibromoethane. The mixture is then heated to about 116° C. and stirred at that temperature for 2 hours. The excess dibromoethane is then removed by steam distillation and thereafter the water by distillation at about 110° C. in vacuo. The result obtained is a suspension containing about 26 g of an orange-red powder of the formula

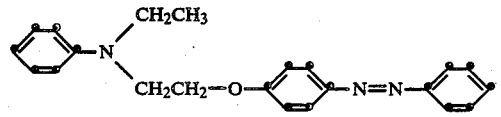

10.8 g of sodium carbonate and 11.3 ml of N-ethylaniline are added to the suspension, the temperature is raised to 120° to 125° C. and stirring is continued at that temperature for 12 hours. Excess N-ethylaniline is then removed by steam distillation. The reaction mixture is cooled down to room temperature, and a viscous pale brown oil settles out. The water is decanted off, the oil is dissolved in acetone, and the small insoluble residue is filtered off. Ice and water are then added to the filtrate, and the precipitate which settles out is filtered off with suction and washed with water to give about 23 g of a golden yellow powder of the formula

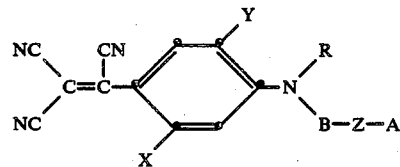

having a melting point of 80°-82° C.

EXAMPLES 2-13

Example 1 is repeated on appropriate intermediates to give the following dyes:

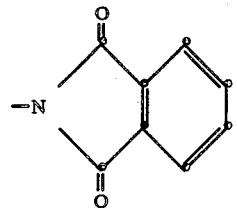

| Example No. | Y | X | R | B | Z | A | Shade on polyester | Melting point |
|---|---|---|---|---|---|---|---|---|
| 2 | H | H | $C_2H_5$ | $C_2H_5$ | direct bond | 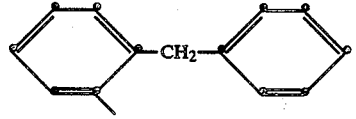 | red | 255–257° |
| 3 | H | H | $C_2H_5$ | $C_2H_4$ | O | 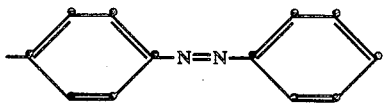 | red | 107–108° |
| 4 | H | H | Benzyl | $C_2H_4$ | O | | red | 94–96° |

-continued
| Example No. | Y | X | R | B | Z | A | Shade on polyester | Melting point |
|---|---|---|---|---|---|---|---|---|
| 5 | H | CH₃ | C₂H₅ | C₂H₄ | O | 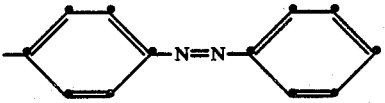 | ruby | 68–70° |
| 6 | H | H | C₂H₅ | (CH₂)₃ | O | 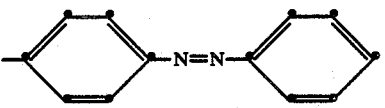 | red | 135–137° |
| 7 | H | H | C₂H₅ | (CH₂)₅ | O |  | red | 118–120° |
| 8 | H | H | C₂H₅ | C₂H₄ | —O—C(=O)— | 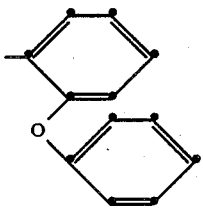 | red | 95–96° |
| 9 | H | H | C₂H₅ | C₂H₄ | —O—C(=O)— | 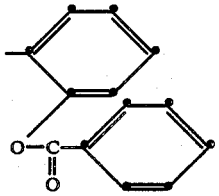 | red | |
| 10 | H | H | C₂H₅ | C₂H₄ | —O—C(=O)— | 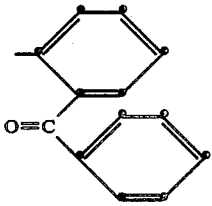 | red | 87–88° |
| 11 | H | H | C₂H₅ | C₂H₄ | —O—C(=O)— | 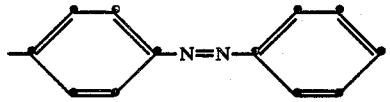 | red | |
| 12 | H | H | C₂H₅ | C₂H₄ | —O—C(=O)— | 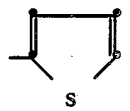 | red | 136–137° |
| 13 | H | CH₃ | C₂H₅ | C₂H₄ | direct bond | 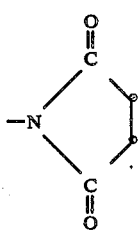 | ruby | 157–158° |

EXAMPLE 14

1 part of dry, extender-free dye of Example 1 is mixed in a sand mill together with 2 parts of dinaphthylmethanedilsulfonate (Na salt), 34 parts of quartz sand and 17 parts of water, and the mixture is ground until a particle size of about 2 ¾ or less is obtained. The suspension formed is separated from the sand to leave a stable liquid formulation. However, the suspension can also be subjected to spray drying, in which case a pulverulent dyeing preparation is obtained.

In the same way it is also possible to produce stable liquid and, if the dyes have a sufficiently high melting point, even solid preparations of the dyes of Examples 2–13.

EXAMPLE 15

Polyethylene terephthalate fabric is impregnated on a padmangle at 40° with a liquor of the following composition:
20 parts of the dye preparation obtained as described in Example 14, finely divided in
10 parts of sodium alginate,
20 parts of octylphenol polyglycol ether and
930 parts of water.

The fabric is squeezed off to about 60%, dried at 100° and then set at a temperature of 210° for 60 seconds. The dyed fabric is washed with water, soaped off or reduction-cleared and dried. The result obtained is a brilliant, lightfast red dyeing which is distinguished in particular by good thermomigration fastness.

Example 16

2 parts of the dye preparation obtained as described in Example 14 are dispersed in 4,000 parts of water containing 12 parts of the sodium salt of o-phenylphenol, 2 parts of ammonium sulfate and 2 parts of the sodium salt of dinaphthylmethanedilsulfonic acid. This liquor is then used to dye 100 parts of polyethylene terephthalate yarn at 95° to 98° for 90 minutes.

The dyeing is subsequently rinsed and aftertreated with aqueous sodium hydroxide solution and a dispersant to give a red dyeing which is fast to light and sublimation.

Example 17

1 part of the dye obtained as described in Example 5 is ground wet together with 2 parts of a 50% aqueous solution of the sodium salt of dinaphthylmethanedisulfonic acid, and the mill base is dried.

This dye preparation is stirred up with 40 parts of a 10% aqueous solution of the sodium salt of N-benzylheptadecylbenzimidazoledisulfonic acid and admixed with 4 parts of a 40% acetic acid solution. A dyebath is prepared therefrom by diluting with water to 4,000 parts.

This bath is then entered at 50° with 100 parts of a polyester fibre material, the temperature is raised to 120° to 130° in the course of halfan hour, and dyeing is carried out at that temperature in a sealed vessel for one hour. This is followed by thorough rinsing to leave a ruby red dyeing having good fastness properties, in particular good sublimation and thermomigration fastness.

What is claimed is:

1. A disperse dye of the formula

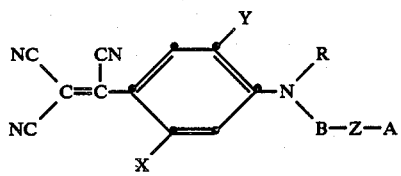

in which
X is hydrogen, $C_1$–$C_4$alkyl, $C_1$–$C_4$alkoxy or halogen, Y is hydrogen, halogen, $C_1$–$C_4$alkyl, $C_1$–$C_4$alkoxy, $C_1$–$C_4$alkoxy-$C_1$–$C_4$alkyl or $C_1$–$C_4$-alkoxy –$C_1$–$C_4$alkoxy, R is hydrogen, $C_1$–$C_{12}$alkyl, $C_2$–$C_{12}$alkenyl or phenyl, or Y and R, together with the nitrogen atom and the two C atoms linking them, form a 5- or 6-ring, B is a straight-chain or branced $C_2$–$C_6$alkylene radical, Z is a bridge member of the formula

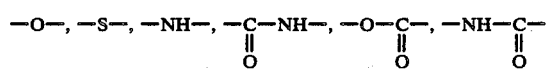

or a direct bond and A is a radical of the formula

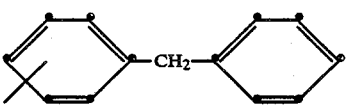

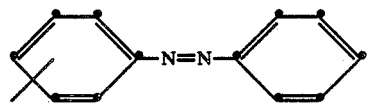

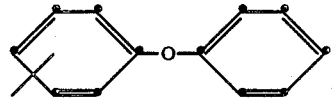

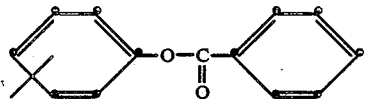

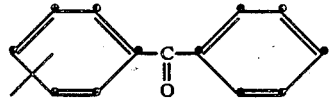

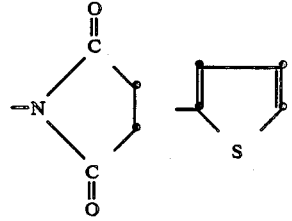

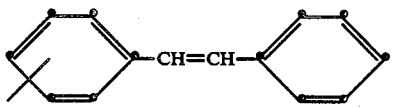

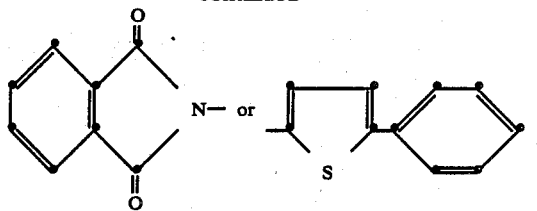

which radicals are unsubtituted or substituted by $C_1$–$C_4$-alkyl, $C_1$–$C_4$-alkoxy, halogen or nitro.

2. A dye according to claim 1, in which X is hydrogen, methyl, methoxy, chlorine or bromine.

3. A dye according to claim 2, in which X is hydrogen or methyl.

4. A dye according to claim 1, in which Y is hydrogen, chlorine, methyl, methoxy, methoxyethyl or methoxyethoxy.

5. A dye according to claim 4, in which Y is hydrogen.

6. A dye according to claim 1, in which R is $C_1$–$C_4$alkyl which is unsubstituted or substituted by hydroxyl, $C_1$–$C_4$ alkoxy or phenyl.

7. A dye according to claim 6, in which R is methyl, ethyl or benzyl.

8. A dye according to claim 1, in which R and Y together with the nitrogen atom and the two C atoms joining them form a 6-ring which is unsubstituted or bears 1 to 3 methyl groups.

9. A dye according to claim 1, in which B is an alkylene radical which is unsubstituted or substituted by hydroxyl.

10. A dye according to claim 9, in which B is ethylene or 1,3-propylene.

11. A dye according to claim 1, in which Z is —O— or

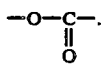

12. A dye according to claim 1, in which A is a radical of the formulae

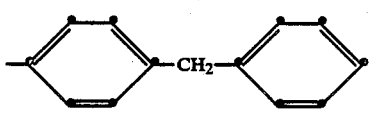

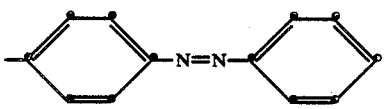

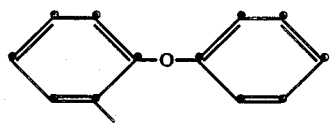

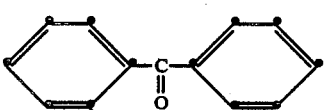

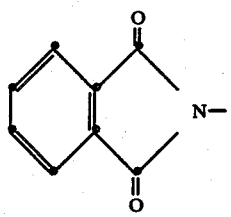

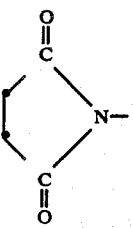

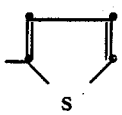

which radicals is unsubstituted or substituted by $C_1$–$C_4$alkoxy, halogen or nitro.

13. A dye of the formula

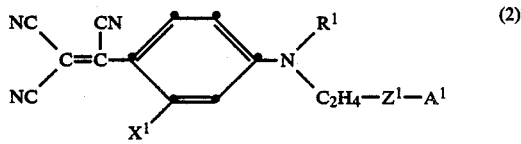

in which
$X^1$ is hydrogen or methyl, $R^1$ is methyl, ethyl or benzyl, $Z^1$ is a direct bond, —O—, —S—or

and $A^1$ is a radical of the formula

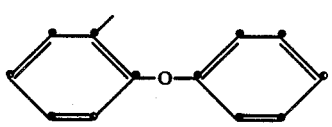

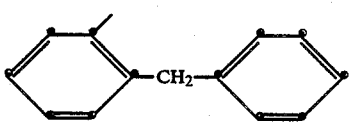

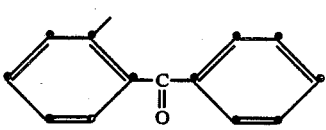

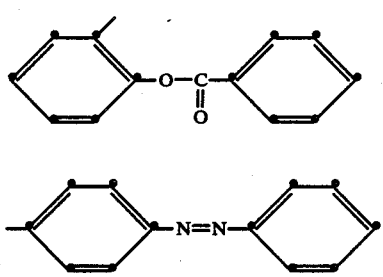
or
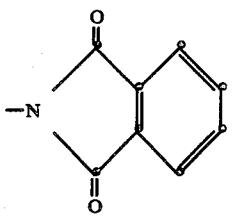
* * * * *